US005973886A

United States Patent [19]

Khuu

[11] Patent Number: 5,973,886

[45] Date of Patent: Oct. 26, 1999

[54] ADJUSTABLE HEAD LOAD RAMP FOR DIGITAL VIDEO DISK DRIVE SYSTEM

[75] Inventor: Hong Khuu, Fremont, Calif.

[73] Assignee: Castlewood Systems, Pleasanton, Calif.

[21] Appl. No.: 08/970,282

[22] Filed: Nov. 14, 1997

[51] Int. Cl.[6] .................................................. G11B 21/22

[52] U.S. Cl. .................................................. 360/105

[58] Field of Search .................................................. 360/105

[56] References Cited

U.S. PATENT DOCUMENTS

| | | | |
|---|---|---|---|
| 3,984,873 | 10/1976 | Pejcha | 360/105 |
| 4,504,879 | 3/1985 | Toldi et al. | 360/105 |
| 4,571,648 | 2/1986 | Barski | 360/105 |
| 4,630,158 | 12/1986 | Spash | 360/105 |
| 4,683,506 | 7/1987 | Toldi et al. | 360/105 |
| 4,722,012 | 1/1988 | Toldi et al. | 360/105 |
| 4,864,437 | 9/1989 | Couse et al. | 360/105 |
| 4,870,518 | 9/1989 | Thompson et al. | 360/99.06 |
| 4,884,155 | 11/1989 | Spash | 360/105 |
| 4,884,261 | 11/1989 | Dalziel | 360/105 |
| 4,920,462 | 4/1990 | Couse et al. | 360/78.04 |
| 4,974,103 | 11/1990 | Iftikar et al. | 360/97.01 |
| 4,975,795 | 12/1990 | Spash | 360/104 |
| 5,034,837 | 7/1991 | Schmitz | 360/105 |
| 5,148,339 | 9/1992 | Yoshida | 360/105 |
| 5,189,575 | 2/1993 | Onooka et al. | 360/105 |
| 5,204,793 | 4/1993 | Plonczak | 360/105 |
| 5,218,503 | 6/1993 | Martin | 360/133 |
| 5,262,918 | 11/1993 | Tannert | 360/133 |
| 5,274,519 | 12/1993 | Saito et al. | 360/105 |
| 5,280,403 | 1/1994 | Martin | 360/133 |
| 5,283,705 | 2/1994 | Iwabuchi | 360/105 |
| 5,289,325 | 2/1994 | Morehouse et al. | 360/105 |
| 5,317,464 | 5/1994 | Witt et al. | 360/99.08 |
| 5,377,065 | 12/1994 | Morehouse et al. | 360/105 |
| 5,426,562 | 6/1995 | Morehouse et al. | 360/97.02 |
| 5,440,436 | 8/1995 | Iftikar et al. | 360/99.12 |
| 5,444,586 | 8/1995 | Iftikar et al. | 360/99.12 |
| 5,448,433 | 9/1995 | Morehouse et al. | 360/97.02 |
| 5,486,964 | 1/1996 | Morehouse et al. | 360/105 |
| 5,526,212 | 6/1996 | Drouin | 360/137 |
| 5,530,607 | 6/1996 | Spendlove | 360/105 |
| 5,550,695 | 8/1996 | Matsumoto | 360/105 |
| 5,570,252 | 10/1996 | Sumner et al. | 360/99.06 |
| 5,572,387 | 11/1996 | Brooks, Jr. et al. | 360/104 |
| 5,574,604 | 11/1996 | Berg et al. | 360/105 |
| 5,617,397 | 4/1997 | Jones et al. | 369/772 |
| 5,638,241 | 6/1997 | Sonderegger | 360/133 |
| 5,644,451 | 7/1997 | Chan et al. | 360/105 |
| 5,764,437 | 6/1998 | Meyer et al. | 360/105 |
| 5,831,795 | 11/1998 | Ma et al. | 360/105 |
| 5,875,074 | 2/1999 | Ho et al. | 360/105 |

FOREIGN PATENT DOCUMENTS

| | | |
|---|---|---|
| 6-005021 | 1/1994 | Japan . |
| 6-005022 | 1/1994 | Japan . |

*Primary Examiner*—Craig A. Renner

*Attorney, Agent, or Firm*—Townsend & Townsend & Crew, LLP

[57] ABSTRACT

A disk drive for use with a digital video disk has an adjustable head load ramp mounted to a housing. The head load ramp comprises a ramp body having a proximal end, a distal end and a cam surface near the distal end. An adjustment mechanism at the proximal end adjustably couples the ramp body to the housing, such that adjustment of the adjustment mechanism varies a height of the cam surface relative to the digital video disk by pivoting the ramp body at a pivot disposed between the proximal end and the distal end.

11 Claims, 6 Drawing Sheets

ADJUSTABLE HEAD LOAD RAMP FOR DIGITAL VIDEO DISK DRIVE SYSTEM

BACKGROUND OF THE INVENTION

The present invention is generally related to recording systems for digital video and other data, and in particular, provides an adjustable ramp for transferring a read/write head to and from a spinning recording surface.

Video Cassette Recorders ("VCRs") dominate the consumer video market, due in part to their combination of low cost and recording capabilities. VCR analog magnetic tape recording cassettes can be used to record, play-back, and store video images in a format which is well adapted for use with existing analog television signals. The ability to record allows consumers to use the standard VHS VCR to save television shows and home movies, as well as for play-back of feature films.

The structure of VCR systems and recording media are adapted to record and archive existing television signals. Specifically, a large amount of analog data is presented on a standard television screen during a standard length feature film. VCR systems record this analog data using analog tape recording media. The VCR tape cassettes can be removed from the recording/play-back equipment for storage, thereby minimizing the system costs when large numbers of movies are stored.

While VCR systems successfully provide recording and archive capabilities at low cost, these existing consumer video systems have significant disadvantages. For example, accessing selected portions of a movie stored on a VCR tape can be quite slow. In particular, the cassette must be rewound to the beginning of the movie between each showing, which can involve a considerable delay. Additionally, transferring data to and from the tape takes a substantial amount of time. There has been little incentive to provide high speed accessing and transfer of the video data, as movies are typically recorded and played by the consumer in real time. Alternatives providing faster access are commercially available (for example, optical video disks), but these alternatives generally have not been able to overcome the VCR's low cost and recording capabilities.

Recent developments in video technology may decrease the VCR's advantages over alternative systems. Specifically, standard protocols have recently been established for High Definition TeleVision ("HDTV"). Although digital video cassette tapes are already available, the amount of data presented in a single HDTV feature film using some of the new protocols will represent a substantial increase over existing digital VCR system capacities. Optical disks may be able to accommodate these larger quantities of digital data. Unfortunately, despite many years of development, a successful low cost optical recording system has remained an elusive goal.

Personal computer magnetic data storage systems have evolved with structures which are quite different than consumer video storage systems. Modern personal computers often include a rigid magnetic disk which is fixed in an associated disk drive. These hard disk drive systems are adapted to access and transfer data to and from the recording surface at high speeds. It is generally advantageous to increase the total data storage capacity of each hard disk, as the disks themselves are typically fixed in the drive system. Hence, much of the data that is commonly used by the computer may be stored on a single disk.

The simplicity provided by a fixed disk drive system helps maintain overall system reliability, and also helps reduce the overall storage system costs. Nonetheless, removable hard disk cartridge systems have recently become commercially available, and are now gaining some acceptance. While considerable quantities of computer data can be stored using these removable hard disk cartridge systems, their complexity, less than ideal reliability, and cost has limited their use to selected numbers of high-end personal computer users.

One particular disadvantage of known removal hard disk cartridge systems is the high cost of the tight tolerance structural components of the disk drive. More specifically, the read/write heads of the disk drive are usually retracted during insertion and removal of the cartridge, and a head load ramp may be used to transfer the head between the retracted position and a data transfer zone along the recording surface. Unfortunately, the arm actuation mechanism, spindle drive motor, and head load ramp are often distributed widely across the housing structure. To maintain the required alignment between these components, known removable hard disk drive housings generally include a machined base structure. These large, accurately machined structures add significantly to the overall cost of the recording system.

In light of the above, it would be desirable to provide improved systems, devices, and methods for storing digital video and other data. It would be particularly advantageous if these improvements were adaptable for use with both video systems and computers, especially if they could be produced and assembled at a lower cost than known removal hard disk systems.

SUMMARY OF THE INVENTION

The present invention generally provides improved systems, devices, and methods for storing digital video and other data. In particular, the present invention provides a disk drive having an easily adjustable head load ramp for transferring a read/write head smoothly between a parked position and a data transfer position along a recording surface of a spinning hard disk. By relying on a simple adjustment mechanism of the head load ramp (rather than maintaining tight machined surface tolerances), the adjustable head load ramp of the present invention allows the use of a low cost base structure, thereby reducing overall system costs.

In a first aspect, the present invention provides a system for storing and retrieving digital video and other data. The system comprises a cartridge containing a disk. The disk has a recording surface. A housing defines a receptacle which removably receives the cartridge. A data transfer head is disposed within the housing, the head being movable between a data transfer zone (adjacent the recording surface) and a park position. A head load ramp smoothly transfers the head between the park position and the data transfer zone. The head load ramp is adjustably mounted to the housing.

In another aspect, the present invention provides a disk drive for use with a cartridge. The cartridge contains a rigid magnetic recording disk having at least one recording surface. The disk drive comprises a housing defining a receptacle which receives the cartridge. An arm articulates relative to the housing between a park position and a data transfer zone. A data transfer head is supported by the arm, and a head load ramp transfers the head to and from the recording surface when the arm moves between the park position and the recording zone. An adjustment mechanism couples the head to the housing. The adjustment mechanism is adapted for varying the height of the head load ramp from the housing.

In yet another aspect, the present invention provides a method comprising mounting a spindle drive and a moveable arm to a housing. A cartridge having a hard disk is inserted into a receptacle defined by the housing. The disk is spun by the spindle drive, and a height of a head load ramp on the housing is adjusted so that a data transfer head supported by the arm can transfer smoothly between the spinning disk and the head load ramp when the arm moves.

DESCRIPTION OF THE PREFERRED EMBODIMENT

The devices, systems, and methods of the present invention generally facilitate alignment of removable rigid magnetic recording disks with the retracted read/write heads of a disk drive. The disk drives of the present invention will preferably make use of a single two sided rigid magnetic recording disk which is capable of storing at least about 2.4 gigabytes of data, the disk ideally being capable of storing at least about 4.7 gigabytes of data. Such disk drive systems are particularly well suited for recording, archiving, and playing back digital video data. In fact, due to the low cost, large capacity, and archivability of the recording systems of the present invention, a standard length movie in a format as suitable for high definition television ("HDTV") may be stored using no more than two cartridges, and ideally may be stored on a single cartridge having a single, two sided hard disk. Additionally, these devices and methods will find applications for storing a wide variety of data for use with notebook computers, desktop computers, and more powerful computer workstations, thereby expanding the benefits of the huge economies of scale provided by the consumer video market to users of digital data recording media.

Figure 1:
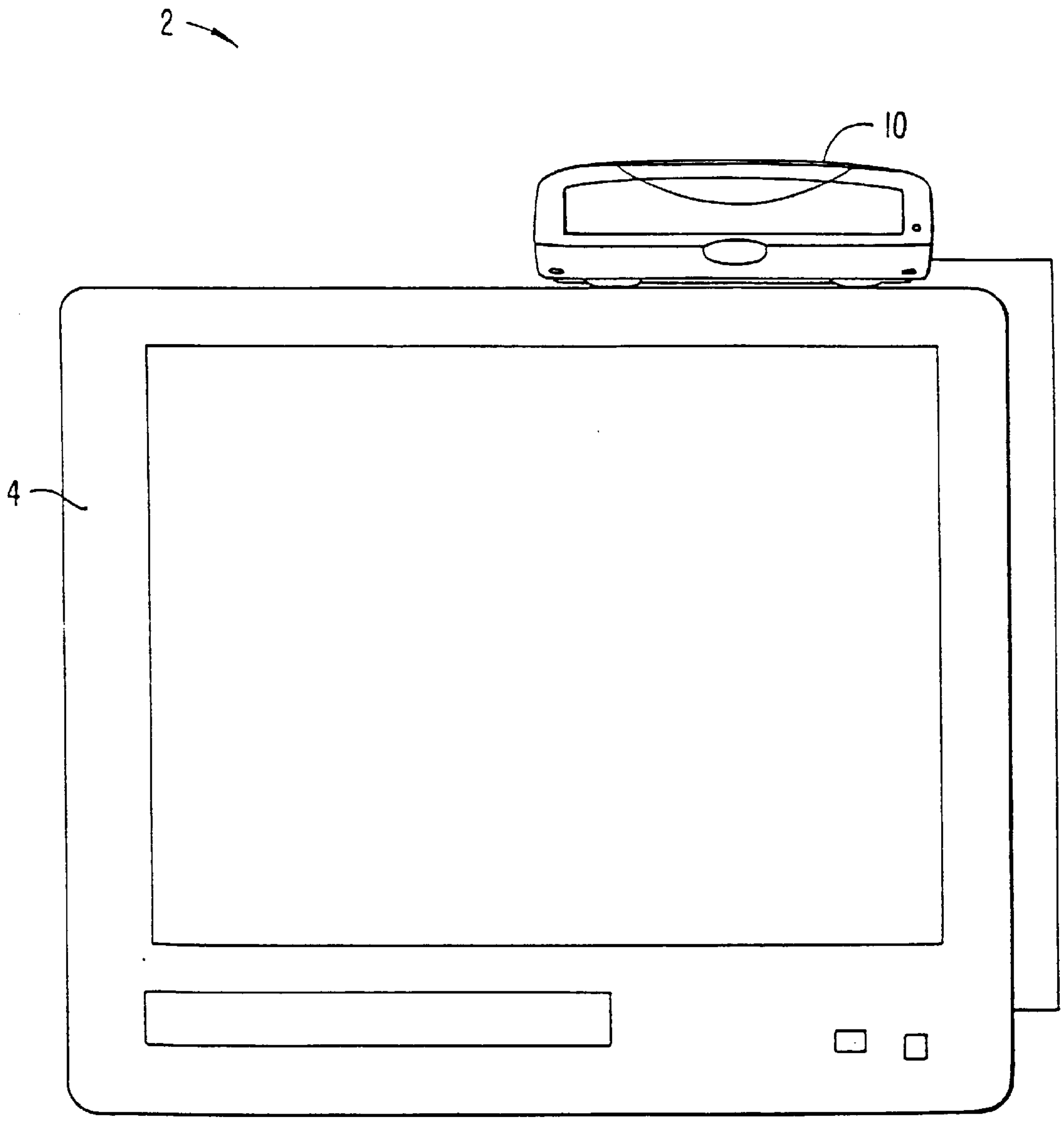
FIG. 1 is a schematic illustration of a video system including a high definition television and an external disk drive, according to the principles of the present invention.

As schematically illustrated in FIG. 1, a video system 2 includes a high definition television ("HDTV") 4 which is directly coupled to an external disk drive 10. External drive 10 will read recorded digital data from a removable disk cartridge, and will transmit that data to HDTV 4, preferably using one of the standard formats or protocols now being established. No general purpose computer need be coupled between external drive 10 and HDTV 4, although such a general purpose computer may be incorporated into video system 2 to allow flexible manipulation of the video data. In the exemplary embodiment, external drive 10 is less than 2 in. by less than 5½ in. by less than 7 in. The small size of the drive (and the small size of the disks on which the movies are stored) helps decrease the overall space which is required for video systems and the associated movie library.

Figure 1A:
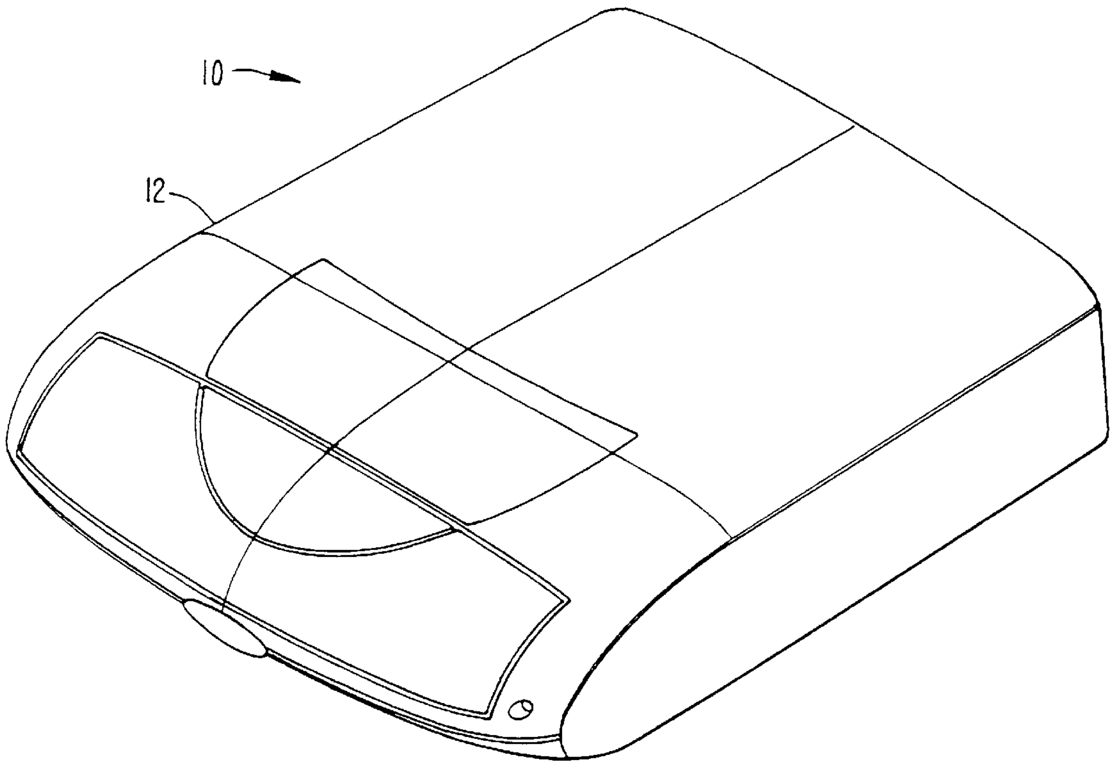
FIG. 1A is a perspective view of the external disk drive of FIG. 1, the external drive being adapted for use with a removable rigid recording disk cartridge.
Figure 1B:
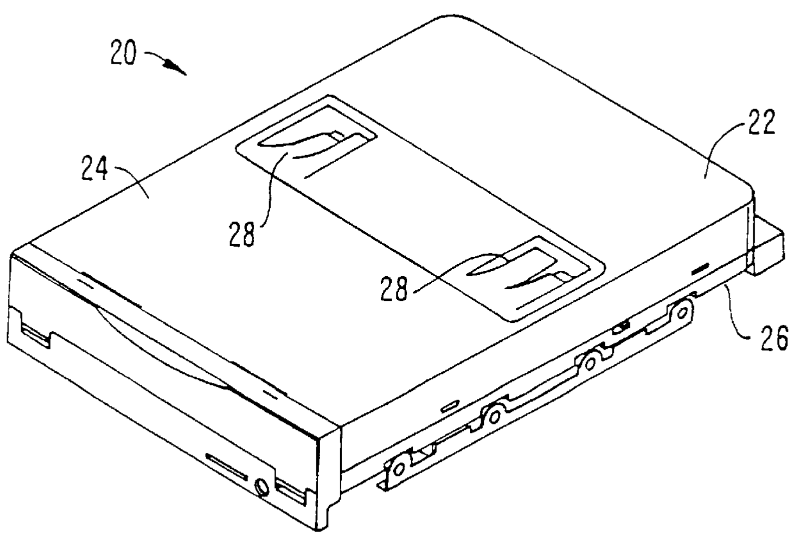
FIG. 1B is a perspective view of an internal disk drive similar to the external drive of FIG. 1A, in which the internal drive is adapted for insertion into a standard bay of a computer.

Referring now to FIGS. 1A and 1B, external disk drive 10 and an internal disk drive 20 will share many of the same components. However, external drive 10 will include an enclosure 12 adapted for use outside of a personal computer, a high definition television, or the like. Additionally, external drive 10 will typically include standard I/O connectors, parallel ports, and/or power plugs similar to those of known computer peripheral or video devices.

Internal drive 20 will typically be adapted for insertion into a standard bay of a computer. In some embodiments, internal drive 10 may instead be used within a bay in a HDTV, thereby providing an integral video system. Internal drive 20 may optionally be adapted for use with bays having a form factor of 2.5 inches, 1.8 inches, 1 inch, or with any other generally recognized or proprietary bay. Regardless, internal drive 20 will typically have a housing 22 which includes a housing cover 24 and a base plate 26. As illustrated in FIG. 1B, cover 24 will preferably include integral springs 28 to bias the cartridge downward within the receiver of housing 22. It should be understood that while external drive 10 may be very different in appearance than internal drive 20, the external drive will preferably make use of base plate 26, cover 24, and most or all of the mechanical, electromechanical, and electronic components of internal drive 20. Cover 24 may be modified for use with external drive 10 so that a label on the cartridge is at least partially visible through a window along the upper surface of enclosure 12.

Figure 2:
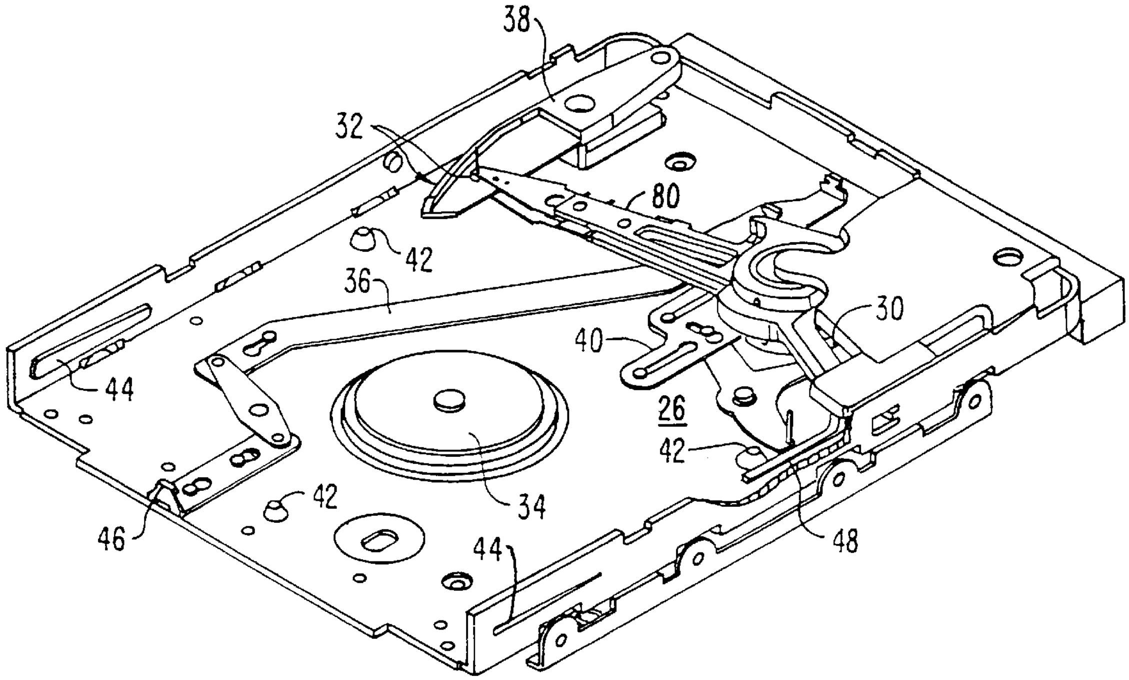
FIG. 2 is a perspective view of the internal disk drive of FIG. 1B, in which a cover of the disk drive has been removed to show a receptacle for the removable cartridge and some of the major disk drive components.

Many of the components of internal drive 20 are visible when cover 22 has been removed, as illustrated in FIG. 2. In this exemplary embodiment, a voice coil motor 30 rotationally positions first and second heads 32 along opposed recording surfaces of the hard disk while the disk is spun by spindle drive motor 34. A release linkage 36 is mechanically coupled to voice coil motor 30, so that the voice coil motor effects release of the cartridge from housing 22 when heads 32 move to a release position on a head load ramp 38. Head load ramp 38 is preferably adjustable in height above base plate 26 to facilitate accurately aligning the head load ramp with the rotating disk.

A head retract linkage 40 helps to ensure that heads 32 are retracted from the disk and onto head load ramp 38 when the cartridge is removed from housing 22. Head retract linkage 40 may also be used as an inner crash stop to mechanically limit travel of heads 32 toward the hub of the disk.

Base 26 preferably comprises a steel sheet metal structure, in which the shape of the base is fully defined by stamping.

Datums 42 are stamped into base 26 to engage and accurately position associated lower surfaces of the cartridge housing. To help ensure accurate engagement of the cartridge with spindle drive 34, rails 44 maintain the cartridge above the spindle until the cartridge is inserted to the appropriate depth, whereupon the cartridge descends under the influence of cover springs 28 to bring the hub of the disk down into aligned engagement with spindle drive 34. A latch 46 of release linkage 36 engages a detent of the cartridge to restrain and maintain the orientation of the cartridge within housing 22. Also illustrated in FIG. 2 is a shaft 48 having a door actuation surface 50 which extends from the structure supporting voice coil motor 30. Note that a portion of a side wall of base plate 26 has been removed to more clearly show the structure and orientation of shaft 48. The base plate is more fully described in co-pending U.S. patent application Ser. No. 08/971,033 (Attorney Docket No. 18525-000600), filed concurrently herewith, the full disclosure of which is incorporated by reference.

Figure 3A:
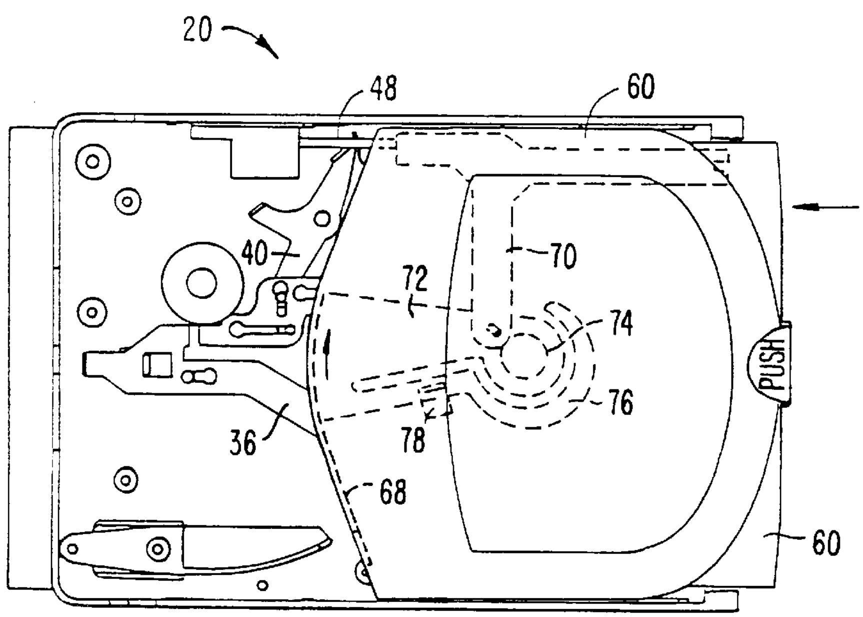
FIG. 3A is an illustration of the cartridge of FIG. 3 being inserted into drive of FIG. 1B.
Figure 3:
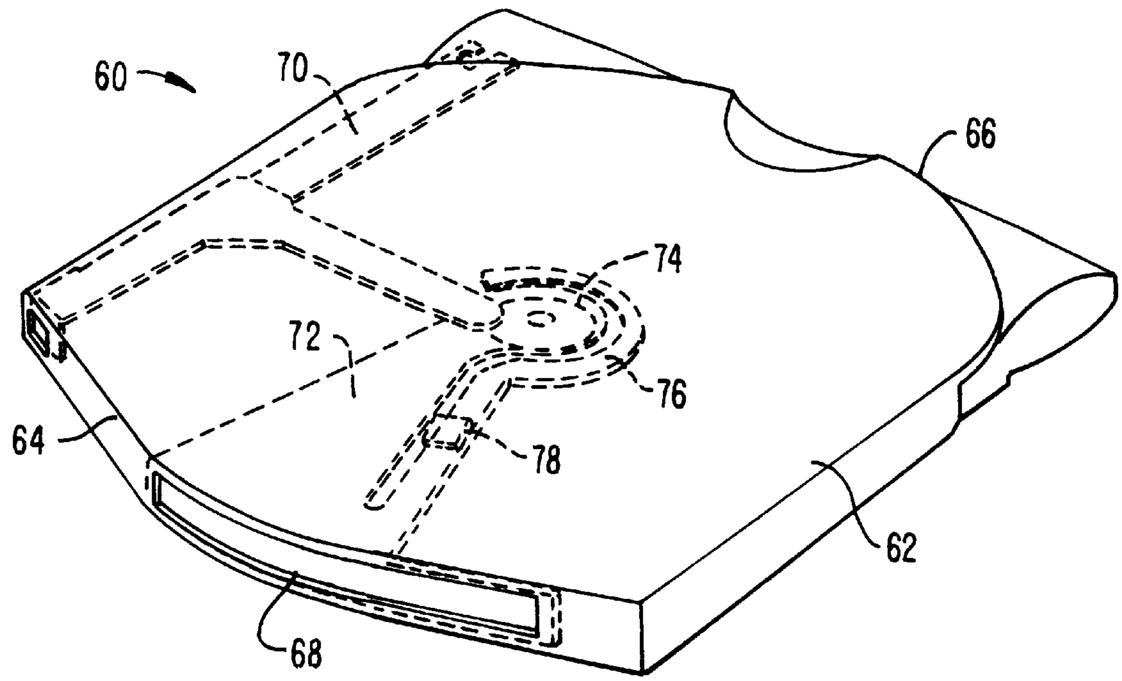
FIG. 3 is a perspective view of a cartridge containing a hard disk, showing the access door and door actuation mechanism.

Referring now to FIG. 3, a cartridge 60 for use with internal drive 20 includes a housing 62 in which a rigid magnetic recording disk is substantially contained. Housing 62 generally defines a front edge 64 and a rear edge 66, and the housing will generally have a opening below the hub of the disk so that the disk can ride upon spindle drive 34 when cartridge 60 is disposed in the receptacle of the drive. Optionally, a ridge may extend from rear edge of the cartridge to facilitate insertion and/or removal of the cartridge, and to avoid any interference between the housing surrounding the receptacle and the user's fingers. The door of the drive may include a corresponding bulge to accommodate such a ridge. In some embodiments, an anti-rattle mechanism having a two-part arm (one portion comprising polymer molded integrally with the door, the other portion comprising a metal and extending from the polymer portion over the hub of the disk) prevents the disk from rattling within the cartridge when the cartridge is removed from the drive.

As can be understood with reference to FIGS. 3 and 3A, insertion of cartridge 60 into the receptacle of internal drive 20 automatically opens a door 68 along front edge 64 of the cartridge. More specifically, shaft 48 engages and slides a door actuation link 70 within the cartridge, and the door actuation link in turn rotates a door assembly 72 about a housing pivot 74. Conveniently, an arm 76 of door assembly 72 can be axially deflected by a feature 78 on an inner surface of housing 62, so that the arm resiliently biases the disk against the lower surface of the cartridge housing when the door is in the closed position. Thus, the door assembly also acts as an anti-rattle mechanism which prevents damage to the disk when the cartridge is handled outside the drive.

As door 68 opens during insertion of cartridge 60 into the disk drive, the door flexes to accommodate variations in the curvature of front edge 64. Once cartridge 60 is fully inserted into the receptacle of internal drive 20, the door is sufficiently opened to provide heads 32 access to the recording surfaces of the disk.

Figure 4A:
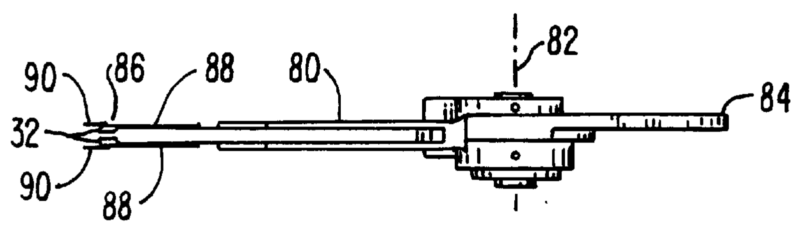
FIGS. 4A and B are a side and top view of an arm assembly supported opposed read/write heads.
Figure 4B:
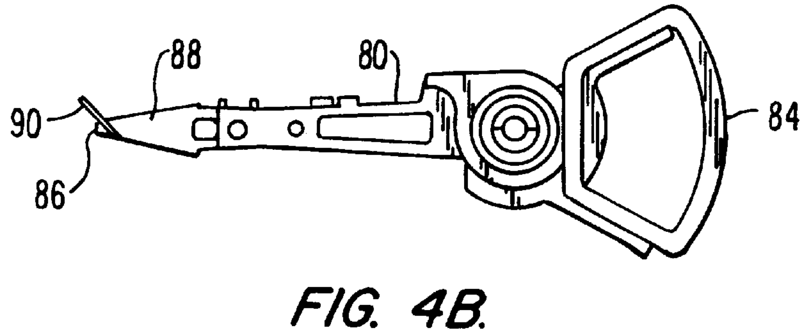

As can be understood with reference to FIGS. 4A, 4B, and 2, heads 32 are supported by an arm 80, which is, in turn, angularly positioned by voice coil motor 30. Arm 80 pivots about an axis 82, and generally defines a proximal end 84 and a distal end 86. Heads 32 are actually supported on resiliently flexible arm extensions 88 along the upper and lower surfaces of the disk. Lifting wires 90 extend both distally and laterally from adjacent heads 32. Although lifting wires 90 are here illustrated as angling laterally and distally, they may alternatively extend first laterally, and then bend and extend distally from the bend. The lifting wires will engage head load ramp 38 when arm 80 is retracted so that heads 32 are clear of the cartridge receptacle, and also facilitate transitioning that heads to the recording surface from this parked position.

Heads 32 will often be separated from the spinning recording surface of disk 66 by a thin layer of air. More specifically, the data transfer head often glides over the recording surface on an "air bearing," a thin layer of air which moves with the rotating disk. Although recording densities are generally enhanced by minimizing the thickness of this air bearing, often referred to as the glide height, excessive contact between the head and the disk surface can decrease the liability of the recording system. To avoid a head crash (in which the data transfer head contacts and damages the disk), the voice coil motor will generally position heads 32 on head load ramp 38 whenever the disk is rotating at insufficient velocity to maintain a safe glide height, as well as during insertion and removal of cartridge 60 from the receptacle.

Figure 5:
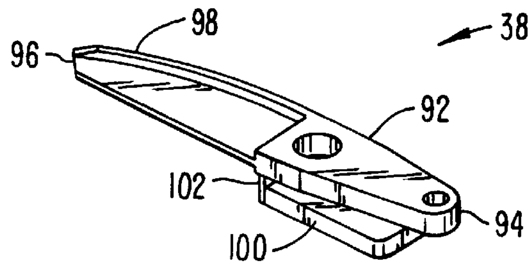
FIG. 5 is a perspective view of a head load ramp, according to the principles of the present invention.
Figure 5A:
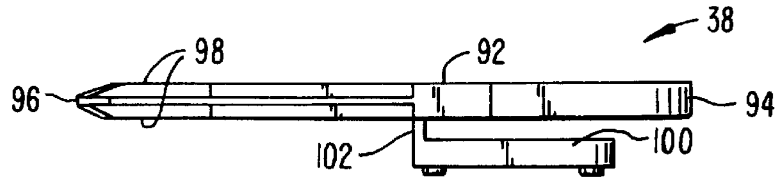
FIGS. 5A and B are a side view and top view, respectively, of the head load ramp of FIG. 5.
Figure 5B:
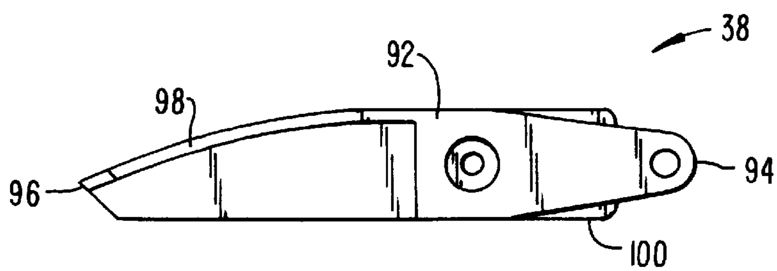

The structure of head load ramp 38 can be understood with reference to FIGS. 5, 5A and 5B. Head load ramp 38 generally comprises an elongate body 92 having a proximal end 94, a distal end 96, and cam surfaces 98 along which lifting wires 90 will slide. Body 92 is attached to a mounting tab 100 through a resiliently flexible member 102. Head load ramp 38 will preferably be injection molded of a polymer, ideally comprising Ultem 1000TI, or the like.

Figure 6:
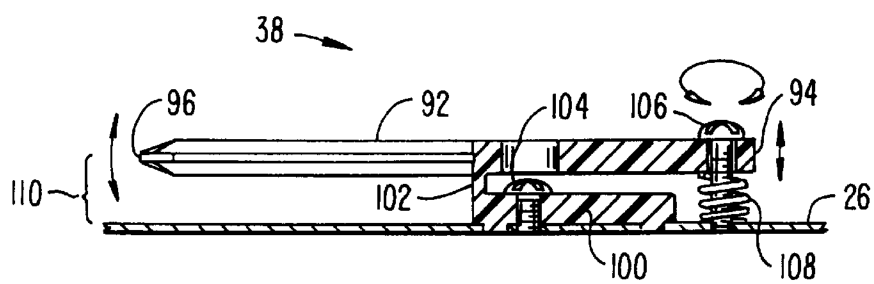
FIG. 6 is a cross-sectional view through the head load ramp of FIG. 5, showing the mounting and height adjustment mechanism.

As can be understood with referenced to FIG. 6, head load ramp 38 is mounted to base 26 by fastening tab 100 to the base with a screw 104. An opening through body 92 facilitates this mounting process. An adjustment screw 106 engages body 92 near proximal end 94, and a biasing spring 108 helps maintain contact between the adjustment screw and the body. By tightening or loosening adjustment screw 106 as shown, body 92 pivots about member 102, with the member acting as a fulcrum. As spring 108 maintains engagement between adjustment screw and body 92, the adjustment screw can be used to both raise and lower ramp height 110 at distal end 96 of the ramp body.

Figure 7:
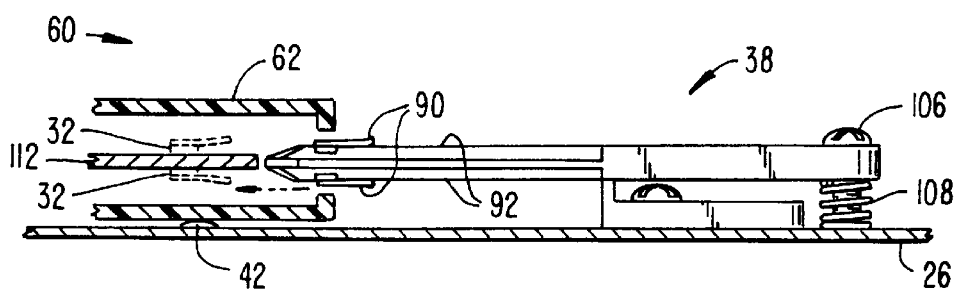
FIG. 7 is a cross-sectional view illustrating how the lifting wires smoothly transfer the read/write heads between the head load ramp and the rotating disk, and also illustrating the alignment between the disk and adjusted head load ramp.

Referring now to FIG. 7, adjustment screw 106 will generally be used to align head load ramp 38 with a disk 112 of cartridge 60. Cartridge housing 62 rides on bosses 42 of base 26, while disk 112 is supported within cartridge 60 by spindle drive 34 (See FIG. 2). The engagement between the spindle drive and disk is more fully described in co-pending U.S. patent application Ser. No. 08/970,867, (Attorney Docket No. 18525-000900), filed concurrently herewith, the full disclosure of which is incorporated herein by reference. Preferably, spindle drive 34 rotates at a fixed location. Arm 80 and voice coil motor 30 are fastened to base 26. The position of disk 112 may be set by bonding the spindle drive motor to base 26, with the location of the disk preferably being adjusted using a gauge during the bonding process. Head load ramp 38 is mounted to base 26 using mounting screw 104, and the height of the distal end of the ramp is then adjusted using adjustment screw 106.

Figure 8:
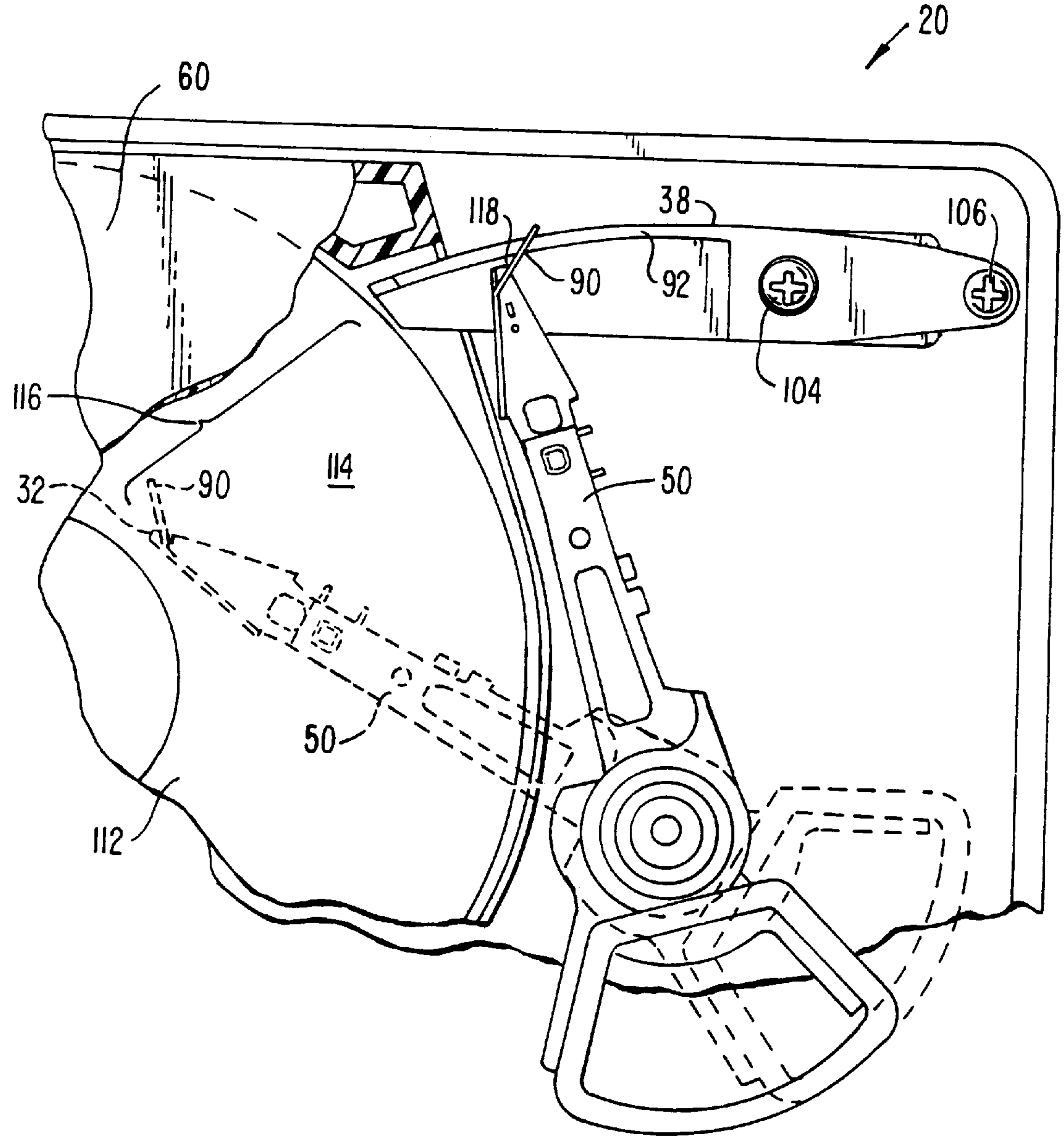
FIG. 8 is a top view of the aligned head load ramp and disk, and also shows the arm transferring the read/write heads between the head load ramp and disk.

Once head load ramp 38 is properly adjusted, lifting wires 90 will ride on cam surfaces 92 while heads 32 move inward relative to disk 112 until the heads are gliding over recording surfaces 114. As illustrated in FIG. 8, heads 32 will generally glide over recording surfaces 114 while arm 80 supports the heads over a recording zone 116. As arm 80 moves heads 32 outward relative to the recording surface, lifting wires 90 engage cam surfaces 92 of head load ramp 38 and lift the heads smoothly from their recording position. Preferably, lifting wires 90 will support parked heads 32 without the parked heads being in contact with head load ramp 38, thereby avoiding wear and contamination of the head surfaces.

As described briefly above, heads 32 and arm 80 may remain at a parked position 118 while cartridge 60 is inserted and removed from the receptacle of the drive, and also while disk 112 spins down to a safe handling speed. In the exemplary embodiment, cartridge 60 is released from the receptacle of drive 20 by voice coil motor 30, with the voice coil motor displacing heads 32 farther up head load ramp 38 so that arm 80 engages and actuates release linkage 36.

While the exemplary embodiment of the present invention has been described in detail, by way of example and for clarity of understanding, a variety of changes, adaptations, and modifications will be obvious to those of skill in the art. Therefore, the scope of the present invention is limited solely by the appended claims.

What is claimed is:

1. A disk drive for use with a digital video disk having an adjustable head load ramp mounted to a housing, the head load ramp comprising:

a ramp body having a proximal end, a distal end and a cam surface near the distal end; and an adjustment mechanism at the proximal end adjustably coupling the ramp body to the housing, such that adjustment of the adjustment mechanism varies a height of the cam surface relative to the digital video disk by pivoting the ramp body at a pivot disposed between the proximal end and the distal end.

2. The head load ramp of claim 1, wherein the adjustment mechanism comprises a screw and a biasing mechanism for maintaining contact between the ramp body and the screw.

3. The head load ramp of claim 1, wherein vertical adjustment of the adjustment mechanism results in vertical movement of the distal end of the ramp body.

4. The head load ramp of claim 1, wherein the pivot comprises a resiliently flexible member extending between the ramp body and the housing, wherein the ramp body pivots about the resiliently flexible member.

5. A disk drive for use with a cartridge, the cartridge containing a rigid magnetic recording disk having at least one recording surface, the disk drive comprising:

a housing defining a receptacle which receives the cartridge;

an arm articulates relative to the housing between a park position and a data transfer zone;

a data transfer head supported by the arm;

a head load ramp having a proximal end and a distal end and a cam surface disposed adjacent the distal end, the cam surface for transferring the head to and from the recording surface when the arm moves between the park position and the recording zone; and an adjustment mechanism engaging the proximal end of the head load ramp and adjustably coupling the head load ramp to the housing, the adjustment mechanism varying the height of the cam surface from the housing by pivoting the head load ramp about a pivot disposed between the proximal end and the distal end.

6. A disk drive as claimed in claim 5, wherein the adjustment mechanism comprises a screw which rotatably engages the head load ramp so that rotation of the screw varies the height of the distal end of the head load ramp.

7. A disk drive as claimed in claim 6, further comprising a biasing structure coupled to the adjustment mechanism, the biasing structure maintaining engagement between the head load ramp and the screw.

8. A disk drive as claimed in claim 5, wherein the arm defines a distal end and a proximal end, wherein the head is resiliently mounted near the distal end of the arm, wherein a lifting wire extends laterally and distally from adjacent the head so that the lifting wire engages the cam surface of the head load ramp to lift the resiliently mounted head from adjacent the recording surface when the arm moves toward the park position.

9. A disk drive for use with a cartridge, the cartridge containing a rigid magnetic recording disk having at least one recording surface, the disk drive comprising:

a housing defining a receptacle which receives the cartridge;

an arm articulates relative to the housing between a park position and a data transfer zone;

a data transfer head supported by the arm;

a head load ramp having a proximal end and a distal end, the head load ramp having a cam surface adjacent the distal end for transferring the head to and from the recording surface when the arm moves between the park position and the recording zone; and an adjustment mechanism adjustable coupling the head load ramp to the housing, the adjustment mechanism varying the height of the cam surface from the housing, wherein the adjustment mechanism comprises a screw which rotatably engages the head load ramp adjacent the proximal end so that rotation of the screw varies the height of the distal end of the head load ramp from the housing by pivoting the head load ramp about a resiliently deflectable fulcrum disposed between the proximal end and the distal end and coupling the housing and the head load ramp.

10. A system for storing and retrieving digital video and other data, the system comprising:

a cartridge containing a disk, the disk having a recording surface wherein the recording surface defines a plane;

a housing defining a receptacle which removably receives the cartridge;

a data transfer head disposed within the housing, the head movable between a data transfer zone adjacent the recording surface and a park position; and a head load ramp having a cam surface which smoothly transfers the head between the park position and the data transfer zone, the head load ramp being mounted to the housing such that the cam surface is adjustable in a direction substantially normal to the plane of the recording surface by an adjustment mechanism, the head load ramp comprising a body having a proximal end and a distal end, wherein the adjustment mechanism engages the body adjacent the proximal end and the cam surface is disposed adjacent the distal end, and wherein the adjustment mechanism moves the body about a pivot disposed between the proximal end and the distal end.

11. A system as claimed in claim 1, wherein the system is adapted for playing a movie.

* * * * *